(12) United States Patent
Hsiao et al.

(10) Patent No.: US 8,913,109 B2
(45) Date of Patent: Dec. 16, 2014

(54) STEREOSCOPIC IMAGE DISPLAY APPARATUS

(75) Inventors: Chia-chiang Hsiao, Guangdong (CN); Zan Yang, Guangdong (CN); Dengxia Zhao, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 324 days.

(21) Appl. No.: 13/635,731

(22) PCT Filed: Jul. 5, 2012

(86) PCT No.: PCT/CN2012/078203
§ 371 (c)(1),
(2), (4) Date: Sep. 18, 2012

(87) PCT Pub. No.: WO2013/185393
PCT Pub. Date: Dec. 19, 2013

(65) Prior Publication Data
US 2013/0335540 A1    Dec. 19, 2013

(51) Int. Cl.
*H04N 13/04*    (2006.01)
(52) U.S. Cl.
USPC ............................................. 348/58; 345/419
(58) Field of Classification Search
CPC ....................................................... G02B 27/26
USPC ............................................................. 348/58
IPC ...................................................... H04N 13/04
See application file for complete search history.

(56) References Cited

U.S. PATENT DOCUMENTS

| 2012/0092335 A1* | 4/2012 | Kim et al. ................. 345/419 |
| 2012/0162211 A1* | 6/2012 | Choi et al. ................ 345/419 |

* cited by examiner

*Primary Examiner* — Jayanti K Patel
*Assistant Examiner* — Yulin Sun
(74) *Attorney, Agent, or Firm* — Kirton McConkie; Evan R. Witt

(57) ABSTRACT

A stereoscopic image display apparatus is described. The stereoscopic image display apparatus includes a display panel, a film-type patterned retarder (FPR) and a barrier layer. The display panel comprises a plurality of scan lines, first data lines, second data lines and pixel units. Each of pixel units comprises a major pixel, a first minor pixel and a second minor pixel wherein the major pixel is coupled to one of the scan lines and one of the first data lines via a first thin-film-transistor, and the first minor pixel and the second minor pixel are coupled to the one of the scan lines and one of the second data lines via a second thin-film-transistor. The FPR is disposed between the display panel and the polarized glasses for receiving the light from the display panel to allow the light to form left-handed circularly polarized light and right-handed circularly polarized light.

10 Claims, 3 Drawing Sheets

STEREOSCOPIC IMAGE DISPLAY APPARATUS

FIELD OF THE INVENTION

The present invention relates to an image display apparatus, and more particularly to a stereoscopic image display apparatus having a film-type patterned retarder (FPR).

BACKGROUND OF THE INVENTION

The three-dimensional image display applies stereoscopic or autostereoscopic technique to display three-dimensional images. The stereoscopic technique implements the three-dimensional effect by the image parallax of the viewer's right and left eyes. The stereoscopic technique includes the methods with the polarized glasses and without the polarized glasses, which are widely applied. In the manner of taking polarized glasses, the image parallax of the viewer's right and left eyes can be displayed on the display apparatus based on direct sense of sight by changing the polarization direction of the image parallax of the viewer's right and left eyes. For example, a film-type patterned retarder (FPR) is applied to liquid crystal display (LCD) so that the viewer is capable of viewing the three-dimensional image using the polarized glasses. In the manner without polarized glasses, an optical plate with the separated image parallax of the viewer's right and left eyes in an optical axis is installed before or after the display apparatus for generating three-dimensional image.

Conventionally, the view faces squarely the three-dimensional image on the LCD to reduce the image crosstalk while viewing the image. That is, the image viewed by the viewer's right and left eyes causes crosstalk with the superimposed image. In the prior art, a gate line is used to control three data lines for transmitting a data signal with red primary color, a data signal with green primary color and a data signal with blue primary color to drive each of the pixels in a pixel structure. A film-type patterned retarder (FPR) is attached above the pixels wherein the arrangement direction of the FPR in one row of pixels is different from the arrangement direction of the FPR in another adjacent row of pixels and black matrix is used to block the light between the three primary colors. However, when an attaching step of the FPR is performed by an attaching machine and causes an attached error, the right eye incorrectly sees the left eye's image and crosstalk occurs. Consequently, there is a need to develop an image display apparatus to solve the aforementioned problem of the image crosstalk while viewing the LCD display disposed in a tilt manner.

SUMMARY OF THE INVENTION

One objective of the present invention is to provide a stereoscopic image display apparatus having a film-type patterned retarder (FPR) to increase the view angle, e.g. vertical view angle, of the stereoscopic image display apparatus so as to avoid the image crosstalk.

Another objective of the present invention is to provide a stereoscopic image display apparatus having a film-type patterned retarder (FPR) to solve the problem of color washout of the stereoscopic image display apparatus.

According to the above objectives, the present invention sets forth a stereoscopic image display apparatus. The stereoscopic image display apparatus adapted to a polarized glasses for viewing a three-dimensional image of the stereoscopic image display apparatus by using the polarized glasses. The stereoscopic image display apparatus comprises a display panel and film-type patterned retarder (FPR). The display panel comprises a plurality of scan lines, a plurality of first data lines, a plurality of second data lines and a plurality of pixel units. The plurality of first data lines are interlaced with the scan lines wherein the first data lines transmit a plurality of first data signals.

The plurality of second data lines are interlaced with the scan lines wherein the second data lines transmit a plurality of second data signals. Each of pixel units comprises a major pixel, a first minor pixel and a second minor pixel wherein the major pixel is coupled to one of the scan lines and one of the first data lines via a first thin-film-transistor, and the first minor pixel and the second minor pixel are coupled to the one of the scan lines and one of the second data lines via a second thin-film-transistor. The film-type patterned retarder (FPR) is disposed between the display panel and the polarized glasses for receiving the light from the display panel to allow the light to form left-handed circularly polarized light and right-handed circularly polarized light.

In one embodiment, the film-type patterned retarder (FPR) comprises a first phase difference region and a second phase difference region adjacent to the first phase difference region, the first phase difference region corresponds to the major pixel, the first minor pixel and the second minor pixel, and the second phase difference region corresponds to the major pixel, the first minor pixel and the second minor pixel.

In one embodiment, a total area of the first minor pixel and the second minor pixel is greater than an area of the major pixel.

In one embodiment, a ratio of the total area of the first minor pixel and the second minor pixel to the area of the major pixel is either 6:4 or 7:3.

In one embodiment, an area of the first minor pixel is less than an area of the major pixel.

In one embodiment, a ratio of the area of the first minor pixel to the area of the major pixel is either 4:6 or 3:7.

In one embodiment, the stereoscopic image display apparatus further comprises a barrier layer having a plurality of barrier regions wherein the first phase difference region and the second phase difference region have one of the barrier regions respectively, and the barrier region corresponds to the second minor pixel.

In one embodiment, when the stereoscopic image display apparatus displays the three-dimensional image, the barrier region is in an opaque status to make the second minor pixel to be opaque.

In one embodiment, when the stereoscopic image display apparatus displays the two-dimensional image, the display panel comprises a first gamma reference voltage and a second gamma voltage, and wherein the display panel maps the first gamma reference voltage to a first driving signal based on the first data signal to drive the major pixel and maps the second gamma reference voltage to a second driving signal based on the second data signal to drive the first minor pixel.

In one embodiment, when the stereoscopic image display apparatus displays the three-dimensional image, the display panel maps the second gamma reference voltage to a first driving signal based on the first data signal to drive the major pixel and maps the first gamma reference voltage to a second driving signal based on the second data signal to drive the first minor pixel.

The present invention provides a stereoscopic image display apparatus to increase the vertical view angle of the stereoscopic image display apparatus and solve the problem of color washout of the stereoscopic image display apparatus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
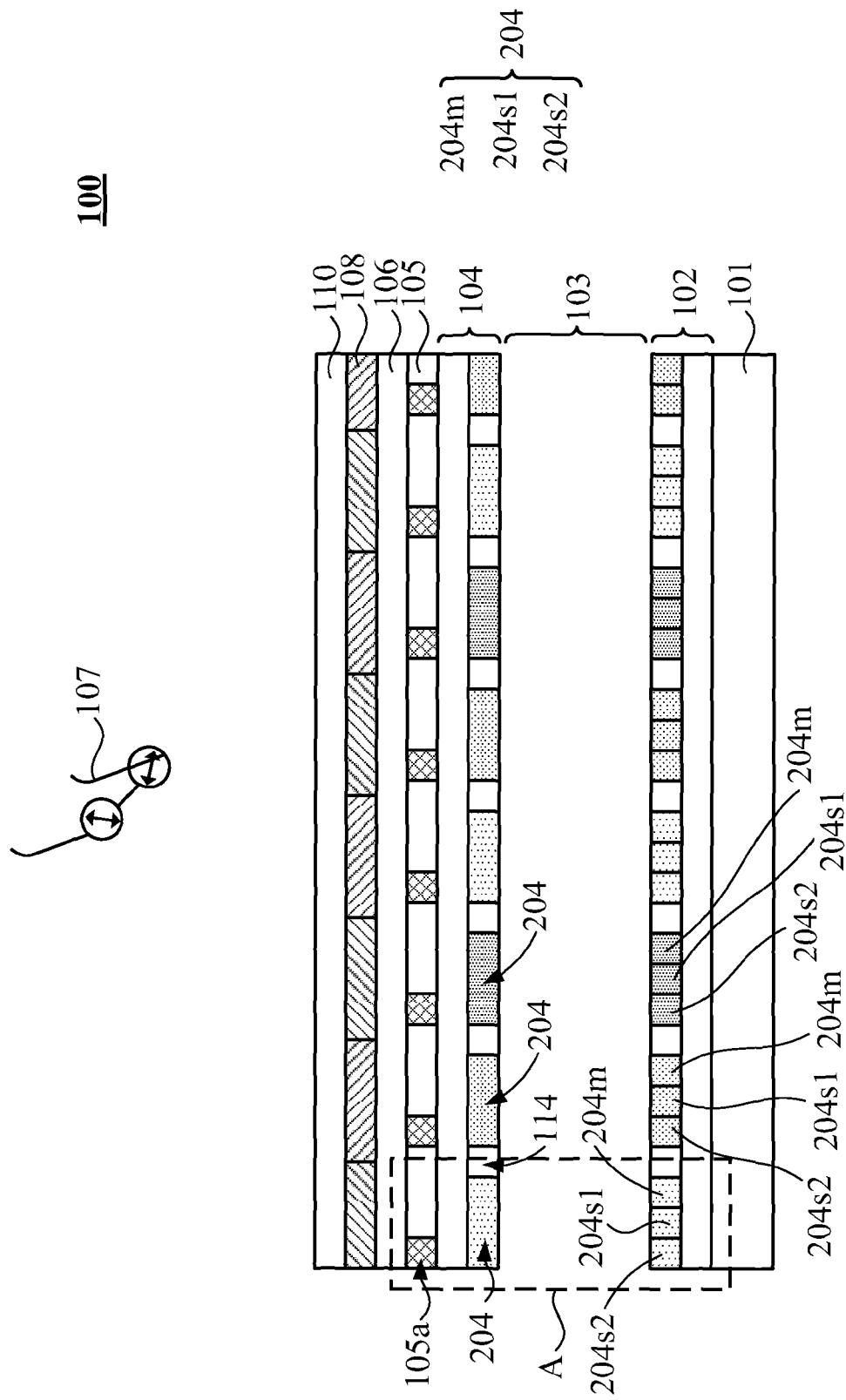
FIG. 1 is a schematic cross-sectional view of a stereoscopic image display apparatus according to one embodiment of the present invention.
Figure 2:
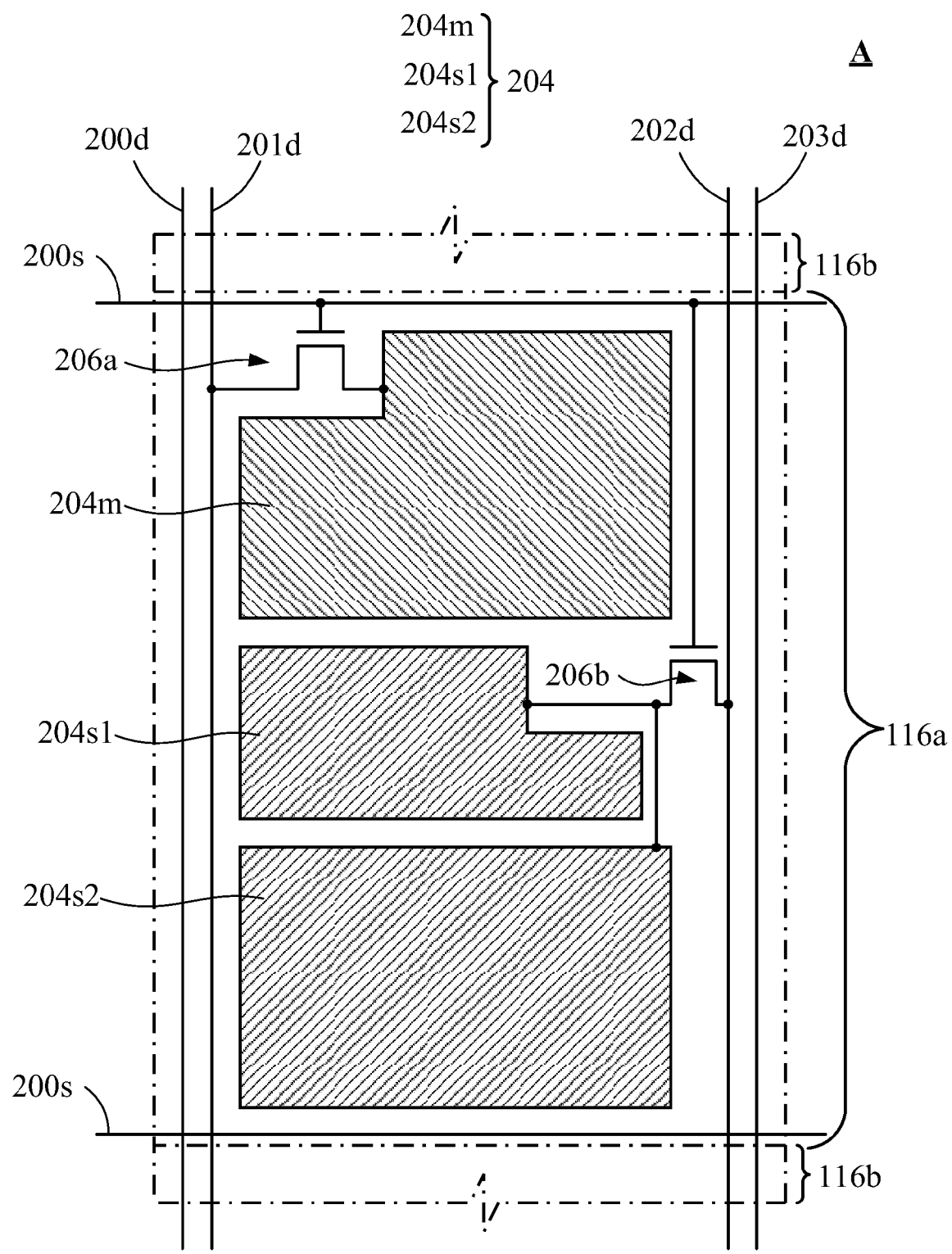
FIG. 2 is a schematic planar view of a stereoscopic image display apparatus in a two-dimensional display status according to one embodiment of the present invention.
Figure 3:
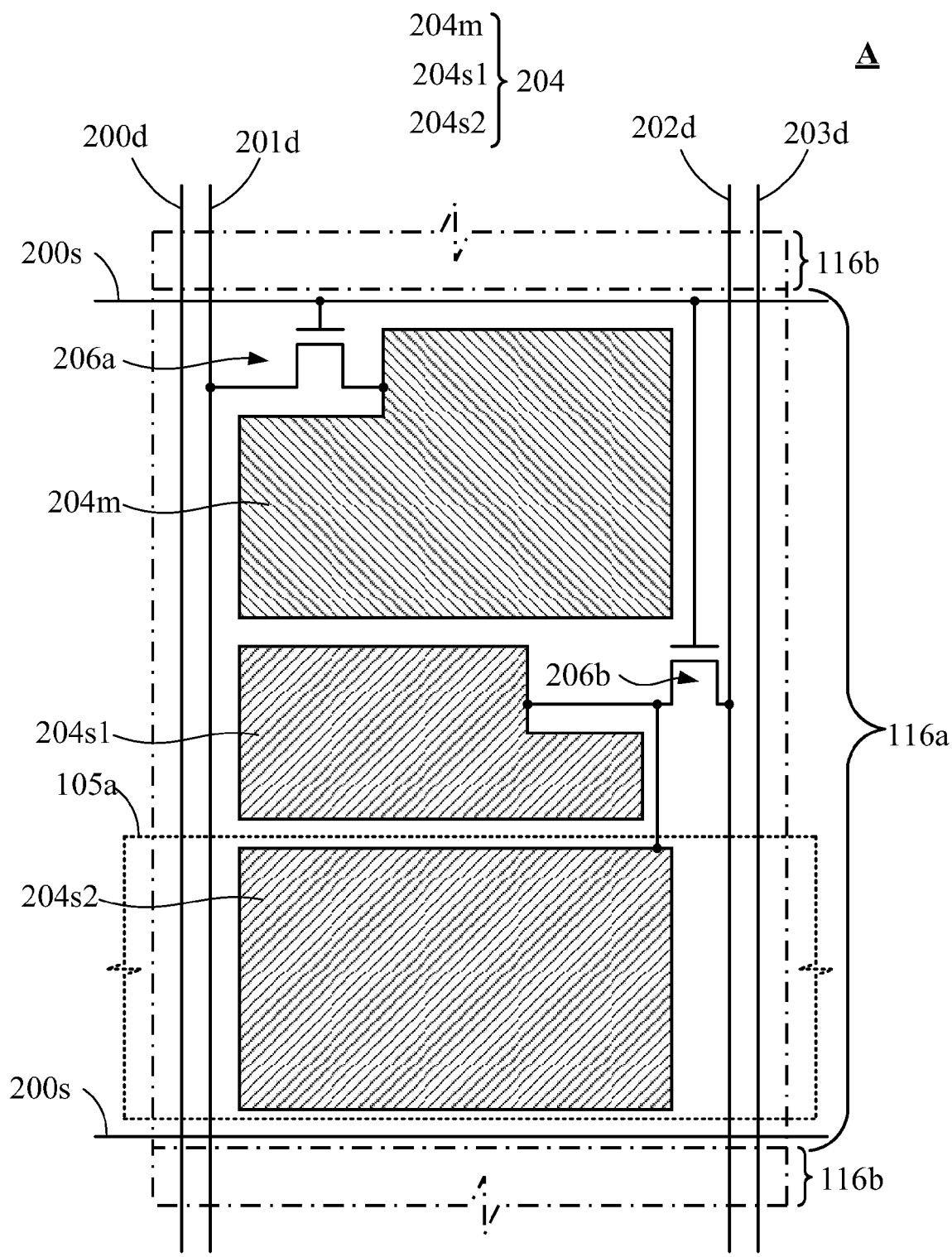
FIG. 3 is a schematic view of a stereoscopic image display apparatus in a three-dimensional display status according to one embodiment of the present invention.

Please refer to FIG. 1 and FIG. 2. FIG. 1 is a schematic cross-sectional view of a stereoscopic image display apparatus 100 according to one embodiment of the present invention. FIG. 2 is a schematic planar view of a stereoscopic image display apparatus 100 in a two-dimensional display status according to one embodiment of the present invention. The stereoscopic image display apparatus 100 is adapted to a polarized glasses 107 for viewing a three-dimensional image generated by the stereoscopic image display apparatus 100 by using the polarized glasses. The stereoscopic image display apparatus 100 comprises a backlight module 101, a display panel 102, a liquid crystal 103, a color filter 104, a barrier layer 105, a polarized plate 106, a film-type patterned retarder (FPR) 108 and a phase difference film 110. The display panel 102 comprises a plurality of scan lines 200s, a plurality of first data lines 201d, a plurality of second data lines 202d and a plurality of pixel units 204. The color filter 104 is disposed in one side of the display panel 102 wherein the color filter 104 has a plurality of black matrixes 114 and a barrier layer 105 thereon. The barrier layer 105 has the polarized plate 106 thereon. The polarized plate 106 has the film-type patterned retarder (FPR) 108 thereon. The film-type patterned retarder (FPR) 108 has the phase difference film 110 thereon.

When the stereoscopic image display apparatus 100 displays the three-dimensional image, the light from the backlight module 101 illuminates the display panel 102 and the color filter 104 receives the light from the display panel 102. The bather layer 105 corresponds the pixel structure to block a portion of light from the color filter 104. The polarized plate 106 then receives the linear polarized light from the barrier layer 105. The linear polarized light then passes through the film-type patterned retarder (FPR) 108 and the phase difference film 110 form the left-handed circularly polarized light and right-handed circularly polarized light. Finally, the left-handed circularly polarized light and right-handed circularly polarized light passes through the polarized glasses 107 to be viewed by the right eye and left eye of the viewer and forms right eye's image and the left eye's image correspondingly so that viewer is capable of observing the three-dimensional image.

FIG. 2 is a schematic planar view of a stereoscopic image display apparatus 100 in a two-dimensional display status according to one embodiment of the present invention. FIG. 2 is a planar amplified view of a partially local cross-sectional region "A". In the display panel 102 of the stereoscopic image display apparatus 100, a plurality of first data lines 210d are interlaced with the scan lines 200s wherein the first data lines 210d transmit a plurality of first data signals. The plurality of second data lines 202d are interlaced with the scan lines 200s wherein the second data lines 202d transmit a plurality of second data signals. Each of pixel units 204 comprises a major pixel 204m, a first minor pixel 204s1 and a second minor pixel 204s2 wherein the major pixel 204m is coupled to one of the scan lines 200s and one of the first data lines 201d via a first thin-film-transistor 206a, and the first minor pixel 204s1 and the second minor pixel 204s2 are coupled to the one of the scan lines 200s and one of the second data lines 202d via a second thin-film-transistor 206b.

When the stereoscopic image display apparatus 100 displays the three-dimensional image, the second thin-film-transistor 206b simultaneously controls the turn-on and turn-off statuses of the first minor pixel 204s1 and the second minor pixel 204s2. For example, the gate electrodes of the first thin-film-transistor 206a and the second thin-film-transistor 206b are enabled, the first data signal and the second data signal are transmitted to the major pixel 204m, the first minor pixel 204s1 and the second minor pixel 204s2 via the source electrodes and the drain electrodes of the first thin-film-transistor 206a and the second thin-film-transistor 206b respectively.

In one embodiment, the barrier layer 105 has a plurality of barrier regions 105a. The film-type patterned retarder (FPR) 108 comprises a first phase difference region 116a and a second phase difference region 116b adjacent to the first phase difference region 116a, wherein the first phase difference region 116a and the second phase difference region 116b have one of the barrier regions 105a respectively, and the barrier region 105a corresponds to the second minor pixel 204s2. When the stereoscopic image display apparatus 100 displays the three-dimensional image, the barrier region 105a is in an opaque status to make the second minor pixel 204s2 to be opaque. Even though when an attaching step of the FPR 108 is performed by an attaching machine and causes an attached error, the right eye incorrectly sees the left eye's image and crosstalk occurs. In one embodiment, the barrier region 105a may be either black matrix or gratings. In other words, the barrier regions 105a are used to block the second minor pixel 204s2 to increase the opaque regions of the second minor pixel 204s2 and the major pixel 204m for the purpose of isolation to reduce the image crosstalk. When the stereoscopic image display apparatus 100 displays the two-dimensional image, the barrier layer 105 is in a transparent status so that the light from the major pixel 204m, the first minor pixel 204s1 and the second minor pixel 204s2 passes through the barrier layer 105 via the color filter 104.

The film-type patterned retarder (FPR) 108 is disposed between the display panel 102 and the polarized glasses 107 for receiving the light from the display panel to allow the light to form left-handed circularly polarized light and right-handed circularly polarized light. The film-type patterned retarder (FPR) 108 comprises a first phase difference region 116a and a second phase difference region 116b adjacent to the first phase difference region 116a, the first phase difference region 116a corresponds to the major pixel 204m, the first minor pixel 204s1 and the second minor pixel 204s2, and the second phase difference region 116b corresponds to the major pixel 204m, the first minor pixel 204s1 and the second minor pixel 204s2.

In one embodiment, a total area of the first minor pixel 204s1 and the second minor pixel 204s2 is greater than an area of the major pixel 204m. In one preferred embodiment, a ratio of the total area of the first minor pixel 204s1 and the second minor pixel 204s2 to the area of the major pixel 204m is either 6:4 or 7:3. In one embodiment, an area of the first minor pixel 204s1 is less than an area of the major pixel 204m. In one preferred embodiment, a ratio of the area of the first minor pixel 204s1 to the area of the major pixel 204m is either 4:6 or 3:7.

When the stereoscopic image display apparatus 100 displays the two-dimensional image, the display panel 102 comprises a first gamma reference voltage and a second gamma voltage wherein the polarities of first gamma reference voltage and a second gamma voltage are different. The display panel 102 maps the first gamma reference voltage to a first driving signal based on the first data signal to drive the major pixel 204*m* and maps the second gamma reference voltage to a second driving signal based on the second data signal to drive the first minor pixel 204*s*1.

When the stereoscopic image display apparatus 100 displays the three-dimensional image, the display panel 102 maps the second gamma reference voltage to a first driving signal based on the first data signal to drive the major pixel 204*m* and maps the first gamma reference voltage to a second driving signal based on the second data signal to drive the first minor pixel 204*s*1. In other words, when the second thin-film-transistor 206*b* enables, the first minor pixel 204*s*1 and the second minor pixel 204*s*2 are in turn-on status. Specifically, when the stereoscopic image display apparatus 100 changes from the status of the two-dimensional image to the status of the three-dimensional image, the first gamma reference voltage used in the major pixel 204*m* is changed to second gamma reference voltage used in the first minor pixel 204*s*1 so that the first minor pixel 204*s*1 is activated (i.e. turn-on) while performing from a low gray level to high brightness of the stereoscopic image display apparatus 100. Then, the major pixel 204*m* is activated (i.e. turn-on) in higher gray level to solve the problem of the washout issue. In other words, the color of the first minor pixel 204*s*1 with lower gray level is mixed to the color of the major pixel 204*m* with higher gray level. Even if the observer views the image display of the liquid crystal display (LCD) in a square view or an oblique view, the observer can still an display image with uniform color level.

In the techniques, e.g. m multi-domain vertical alignment (MVA), capable of meeting the requirement of wide view angle, the stereoscopic image display apparatus 100 maintains the major pixel 204*m* and the first minor pixel 204*s*1 to be activated (i.e. turn-on) when the stereoscopic image display apparatus 100 changes from the status of the two-dimensional image to the status of the three-dimensional image to the prevent the washout issue. Meanwhile, the barrier regions 105*a* of the barrier layer 105 are used to block the second minor pixel 204*s*2 to increase the opaque regions of the second minor pixel 204*s*2 and the major pixel 204*m* for the purpose of isolation to reduce the image crosstalk.

The present invention provides a stereoscopic image display apparatus to increase the vertical view angle of the stereoscopic image display apparatus and solve the problem of color washout of the stereoscopic image display apparatus.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A stereoscopic image display apparatus adapted to a polarized glasses for viewing a three-dimensional image of the stereoscopic image display apparatus by using the polarized glasses, the stereoscopic image display apparatus comprising:
   a display panel, comprising:
      a plurality of scan lines;
      a plurality of first data lines interlaced with the scan lines wherein the first data lines transmit a plurality of first data signals;
      a plurality of second data lines interlaced with the scan lines wherein the second data lines transmit a plurality of second data signals; and
      a plurality of pixel units, each of pixel units comprising a major pixel, a first minor pixel and a second minor pixel wherein the major pixel is coupled to one of the scan lines and one of the first data lines via a first thin-film-transistor, and the first minor pixel and the second minor pixel are coupled to the one of the scan lines and one of the second data lines via a second thin-film-transistor; and
   a film-type patterned retarder (FPR), disposed between the display panel and the polarized glasses, for receiving the light from the display panel to allow the light to form left-handed circularly polarized light and right-handed circularly polarized light.

2. The stereoscopic image display apparatus of claim 1, wherein the film-type patterned retarder (FPR) comprises a first phase difference region and a second phase difference region adjacent to the first phase difference region, the first phase difference region corresponds to the major pixel, the first minor pixel and the second minor pixel, and the second phase difference region corresponds to the major pixel, the first minor pixel and the second minor pixel.

3. The stereoscopic image display apparatus of claim 1, wherein a total area of the first minor pixel and the second minor pixel is greater than an area of the major pixel.

4. The stereoscopic image display apparatus of claim 3, wherein a ratio of the total area of the first minor pixel and the second minor pixel to the area of the major pixel is either 6:4 or 7:3.

5. The stereoscopic image display apparatus of claim 1, wherein an area of the first minor pixel is less than an area of the major pixel.

6. The stereoscopic image display apparatus of claim 5, wherein a ratio of the area of the first minor pixel to the area of the major pixel is either 4:6 or 3:7.

7. The stereoscopic image display apparatus of claim 1, further comprising a barrier layer having a plurality of barrier regions wherein the first phase difference region and the second phase difference region have one of the barrier regions respectively, and the barrier region corresponds to the second minor pixel.

8. The stereoscopic image display apparatus of claim 1, wherein when the stereoscopic image display apparatus displays the three-dimensional image, the barrier region is in an opaque status to make the second minor pixel to be opaque.

9. The stereoscopic image display apparatus of claim 1, wherein when the stereoscopic image display apparatus displays the two-dimensional image, the display panel comprises a first gamma reference voltage and a second gamma voltage, and wherein the display panel maps the first gamma reference voltage to a first driving signal based on the first data signal to drive the major pixel and maps the second gamma reference voltage to a second driving signal based on the second data signal to drive the first minor pixel.

10. The stereoscopic image display apparatus of claim 9, wherein when the stereoscopic image display apparatus displays the three-dimensional image, the display panel maps the second gamma reference voltage to a first driving signal based on the first data signal to drive the major pixel and maps the first gamma reference voltage to a second driving signal based on the second data signal to drive the first minor pixel.

* * * * *